United States Patent [19]

Dalle Carbonare

[11] 4,337,497
[45] Jun. 29, 1982

[54] DEVICE FOR DETECTING THE DIRECTION AND CHANGE OF ROTATIONAL SPEED OF A ROTATING ELEMENT

[75] Inventor: Gianbattista Dalle Carbonare, Pavia, Italy

[73] Assignee: Honeywell Information Systems Inc., Waltham, Mass.

[21] Appl. No.: 199,883

[22] Filed: Oct. 23, 1980

[51] Int. Cl.³ .............................................. G01P 3/36
[52] U.S. Cl. ................................. 361/239; 324/175
[58] Field of Search ................ 361/240, 239; 324/165, 324/175; 356/28

[56] References Cited

U.S. PATENT DOCUMENTS

| | | | |
|---|---|---|---|
| 3,299,702 | 1/1967 | Hulme | 324/165 |
| 3,944,923 | 3/1976 | Luteran | 324/165 |
| 4,037,157 | 7/1977 | Campbell | 324/175 |
| 4,228,396 | 10/1980 | Palombo et al. | 324/165 |
| 4,237,517 | 12/1980 | Myers | 361/240 |

*Primary Examiner*—J. D. Miller
*Assistant Examiner*—L. C. Schroeder

*Attorney, Agent, or Firm*—George Grayson; Nicholas Prasinos; Ronald T. Reiling

[57] ABSTRACT

Device for detecting the direction and change of rotational speed of a rotating element. In one embodiment, a pair of phototransistors which are energized by a light source according to an ordered sequence through a disk formed by opaque and transparent sectors coupled to the rotating element. The two phototransistors controls, when energized the switching on of two transistors which enable the discharge of two capacitors, charging with a predetermined time constant in the interval time between discharges. The discharge control action of one of the two phototransistors on a first capacitance is however conditioned by the charge level reached by the other capacitance and therefore both by the order in which phototransistors are energized and by the energization frequency. If the energization frequency is lower than a certain limit or the energization order is not the correct one, the first capacitor reaches a charge level higher than a reference value and supplies an indication signal accordingly.

3 Claims, 4 Drawing Figures

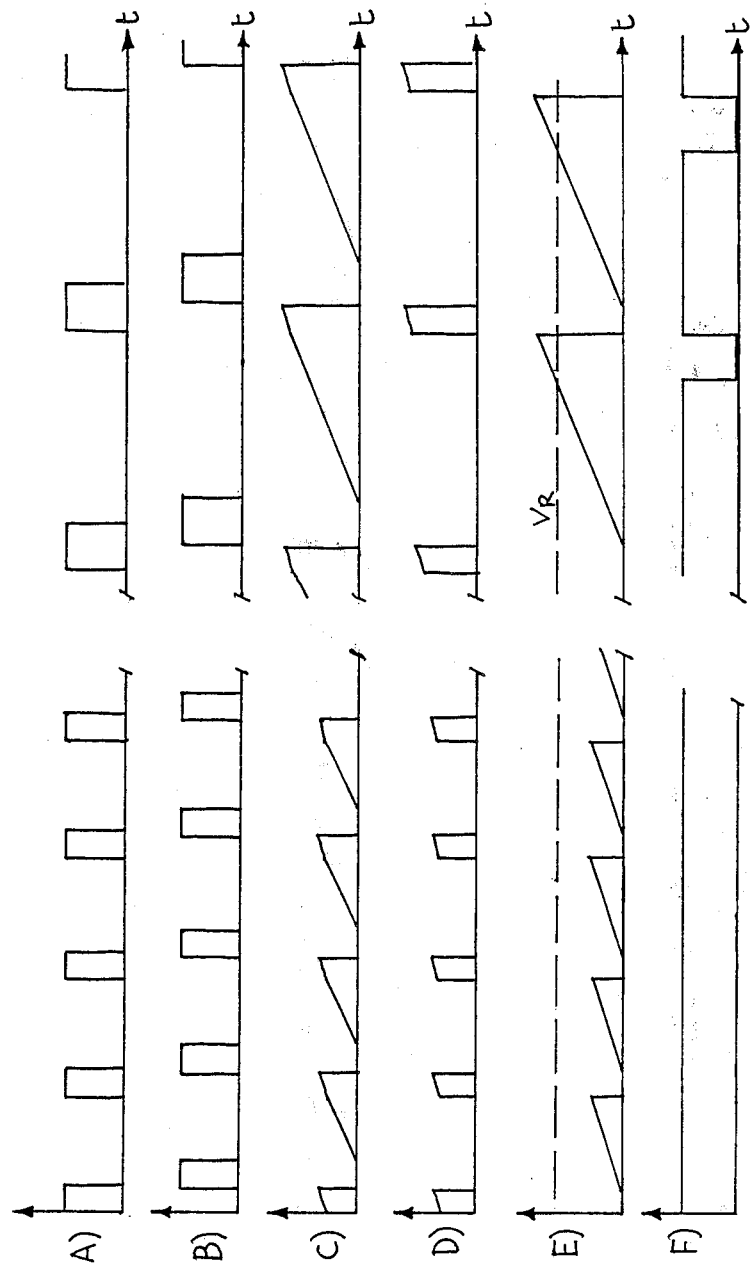

DEVICE FOR DETECTING THE DIRECTION AND CHANGE OF ROTATIONAL SPEED OF A ROTATING ELEMENT

BACKGROUND OF THE INVENTION

1. Field of the Invention

The present invention relates to devices for detecting and signalling the direction of rotation of a rotating element and any variation from a predetermined rotational speed.

2. Description of the Prior Art

Devices suitable for detecting the speed of rotation of a rotating element are known in the prior art. French Pat. No. 2,404,855 describes a digital tachometer which utilizes a logic circuit comprised of eight AND and two OR gates having two inputs and two ouputs. Two pulse signals are applied to the inputs. According to the direction of rotation, one of the two inputs is at logic level 0 while the other output presents a pulse train whose frequency is proportional to the rotational speed. However this complex device is not capable of detecting by itself the direction and the speed of rotation of a rotating element; to carry out such operation further circuits are needed, such modification would increase both the complexity and cost of the device.

SUMMARY OF THE INVENTION

The present invention is simplified and therefore is particularly suitable as a protection circuit, as well as useful in several control applications; i.e. fan monitoring. Cooling fans are necessary to dispose of the heat developed inside the equipment which are characterized by electrical heat-converted power losses; as for instance motion-picture projectors, power supplies for processors and electronic equipments. For ventilation purposes electrical fans are well known in the prior art, such as U.S. Pat. No. 3,935,522, but their main purpose is to obtain different working speeds for the fan without providing any protection from possible failures.

When used for ventilation the device of the present invention controls a rotational speed higher than a predetermined value, as well as providing an intervention signal if the fan stops or rotates at a speed lower than a predetermined value. Additionally the device provides an intervention signal in case the fan rotates in the opposite direction which can occur in a system comprising several fans, such that such opposite rotation can be caused by the air flow generated by the other fans.

BRIEF DESCRIPTION OF THE DRAWINGS

These and other features of the invention will appear more clearly from the following detailed description of a preferred form of embodiment and from the attached drawings in which:

FIGS. 2a and 2b show the signal waveforms at different points of the circuit where the direction of rotation is correct and where the rotational speed is higher and lower respectively than a predetermined critical speed.

DESCRIPTION OF THE PREFERRED EMBODIMENT

Figure 1:
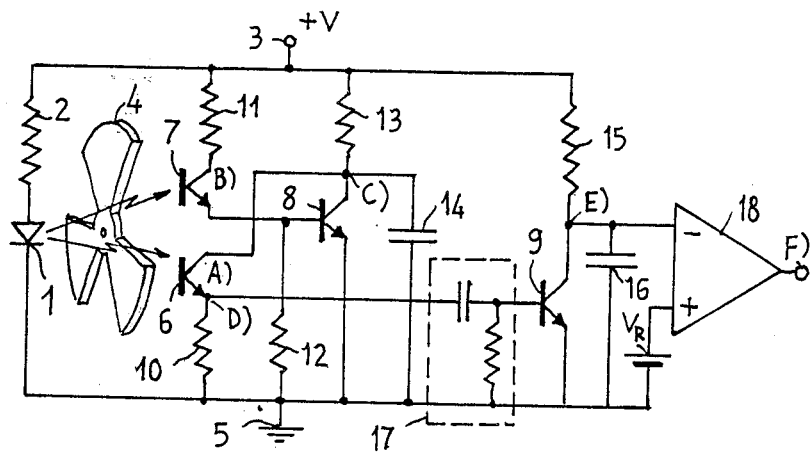
FIG. 1 shows the preferred embodiment of the invention.

With reference to FIG. 1, the present invention comprises an emitting photodiode 1 whose cathode is connected to ground 5 and whose anode is connected through resistor 2 to the positive pole 3 of a +V continuous voltage source. The negative pole of such continuous voltage source (not shown) is connected to ground 5. Diode 1 is directly polarized and emits light radiation. A disk 4, having opaque and transparent sectors, is fixed to a shaft (not shown) whose direction and speed of rotation is to be monitored. Together with photodiode 1, the disk 4 forms a light pulse generator which energizes two phototransistors 6 and 7. The light pulse duration depends both on the rotational speed of disk 4 and the angular width of the disk's transparent sectors.

During rotation of the disk 4 the two phototransistors 6 and 7 are placed in slightly different angular positions such that one phototransistor is lighted before the other one; although in a particular angular position of the disk the two phototransistors can be lighted at the same time. Also the fan itself with its vanes may perform the function of disk 4. Phototransistor 6 has its emitter connected both to ground, through a resistor 10, and to the base of transistor 9; its collector is connected to the collector of transistor 8. Transistor 9 has its emitter connected to ground and its collector connected to a +V voltage source through resistor 15. Transistor 8 has its emitter connected to ground and its collector connected to a +V voltage source through a resistor 13. A capacitor 14 is connected between the collector of transistor 8 and ground.

Phototransistor 7 has its collector connected to the +V voltage source through a resistor 11 and its emitter connected to the base of transistor 8. A resistor 12 is connected between the base of transistor 8 and ground. Transistor 8 is brought to saturation by phototransistor 7, and has a frequency proportional to the rotational speed of disk 4, thereby allowing capacitor 14 to discharge. It is to be noted that when phototransistor 6 is lighted, and therefore conducting, the voltage level present on capacitor 14 is shared between the internal resistance of phototransistor 6 and resistor 10. Depending on its level, the voltage drop on resistor 10 can bring or not bring transistor 9 in saturation. The collector of transistor 9 is connected to the inverting input of a comparator 18. A capacitor 16 is connected between collector of transistor 9 and ground. Even when conducting, transistor 9 allows capacitor 16 to discharge. A reference voltage $V_R$ corresponding to a suitable fraction of the voltage supply +V, is applied to the non-inverting input of comparator 18. This value $V_R$ is the comparator 18 threshold voltage.

The operation of the circuit is now considered in detail. When the light emitted by photodiode 1 energizes phototransistor 7, a base current is generated causing conduction of phototransistor 7. Through resistor 11 a collector current is therefore drawn and consequently another current with the same order of magnitude flows through resistor 12, causing in it such a voltage drop as to bring transistor 8 to saturation. As soon as transistor 8 gets to saturation, capacitor 14 (which is charged during the time intervals when transistor 8 is not conductive, with a time constant given by the value of resistor 13 and capacitor 14) is quickly discharged through transistor 8. When the light pulse is terminated, phototransistor 7 and phototransistor 8 are returned to interdiction so that capacitor 14 begins to charge again. When the light emitted by photodiode 1 energizes phototransistor 6, it becomes conductive presenting an internal resistance value relativelylow if compared with the value of resistor 10. In such a situation nearly the whole voltage present at capacitor 14 is applied to resistor 10. During the period when phototransistor 6 is conducting, the charge time constant of capacitor 14 decreases.

It is now assumed that disk 4 rotates in order to energize first phototransistor 6 and with a short delay phototransistor 7 (this sequence corresponds to the desired direction of rotation). Refer to FIG. 2a where signal waveforms at several circuit points are shown.

Diagram A shows a timing diagram of the saturation/conduction or interdiction status of phototransistor 6.

Diagram B shows a timing diagram of the saturation/conduction or interdiction status of phototransistor 7.

Diagram C shows a timing diagram of the charge status of capacitor 14. In case of correct direction of rotation, the time interval from the end of light pulse on phototransistor 7 to the beginning of the next light pulse on phototransistor 6 is sufficiently long to enable capacitor 14 to charge at a voltage value which suffices to bring to saturation transistor 9, through the voltage divider formed by the internal resistance of phototransistor 6 and by resistor 10 when phototransistor 6 is conductive.

Figure 3:
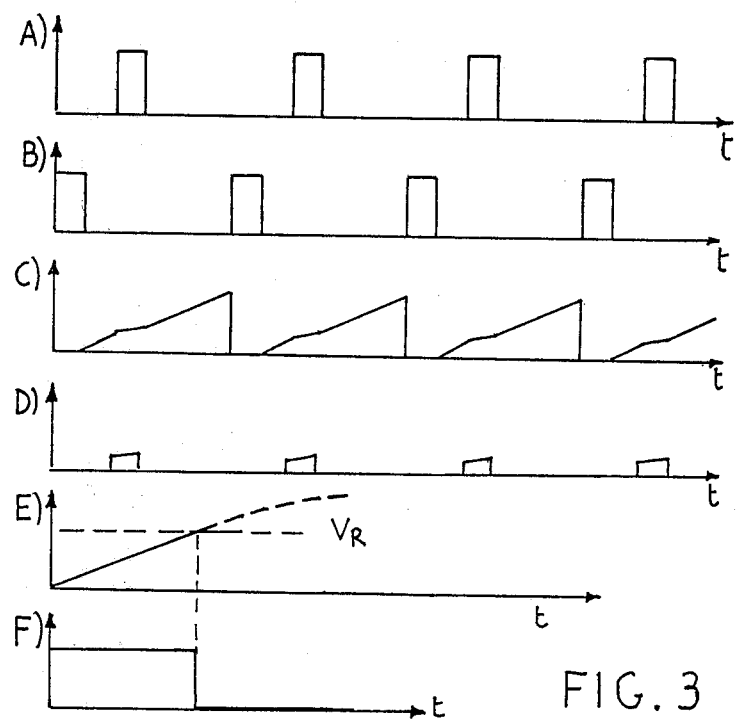
FIG. 3 shows the signal waveforms at different points of the circuit where the direction of rotation is incorrect.

Diagram D shows a timing diagram of the conduction status of phototransistor 6. During the interval in which phototransistor 6 is conductive, capacitor 16, which was previously charging through resistor 15, is quickly discharged through transistor 9 (Diagram E). Therefore when phototransistor 6 is lighted before phototransistor 7 and the illumination cycles follow with an adequate frequency, capacitor 16 will not reach a charge voltage so high in value as to equal or exceed the reference voltage value $V_R$. Comparator 18 output will therefore have a high voltage value (Diagram F). It is however evident that if rotation speed decreases to a value for which the luminous pulse train frequency decreases to a value lower than a predetermined minimum one given by:

$$f_{min} = 1/[R_{15}C_{16}l_n(1-\alpha)]$$

where $R_{15}$=resistor 15 value, $C_{16}$=capacitance 16 value and $l_n$ is the natural logarithm notation, the voltage ramp of terminals of capacitor 16 reaches the $V_R$ value of the reference voltage and the output of comparator 18 is brought intermittently down to a low voltage value (Diagram F, FIG. 2b). Therefore to avoid that the comparator output rises again to a high voltage value following the discharge of capacitor 16, a simple logic network can be used to memorize the occurrence of an anomalous working condition. It is now assumed that disk 4 rotates in a way as to light phototransistor 7 first and then phototransistor 6 (sequence corresponding to wrong direction of rotation). Therefore the time interval from the end of light pulse on phototransistor 7 and the beginning of the light pulse on phototransistor 6 is too short to enable the charge voltage of capacitor 14 to reach a relatively high value. Consequently during conduction of phototransistor 1 the voltage drop on resistor 10 is not sufficient to bring transistor 9 in saturation. Therefore the charge of capacitor 16 reaches in a short time, the $V_R$ value of the voltage reference and consequently output of comparator 18 will drop to a low voltage value. FIG. 3 shows with its waveforms the above situation.

In the preferred embodiment of the invention, photosensitive detectors convert the rotational movement into electrical signals. Such detector elements are inexpensive and offer several possibilities of utilization. Obviously without departing from the scope of the invention, other kinds of transducers can be used to convert the rotational movement into a train of electrical pulses, as for instance, magnetoelectrical transducers. Likewise circuit modifications can be made to the device. For instance, the emitter of transistor 6 can be connected to the base of transistor 9 through an RC derivative circuit 17 shown in FIG. 1. It may happen that at the power-on, disk 4 does not start to move and that its sectors stand in such a position as to energize the phototransistor 6 but not phototransistor 7. Therefore a relatively high continuous voltage is available at resistor 10 which locks transistor 9 in saturation. Consequently the charge voltage of capacitor 16 does not reach the $V_R$ value and the device does not intervene to detect an anomal working condition. Derivative circuit 17, making transistor 9 sensitive at the rise fronts only of the voltage present at resistor 10 avoids such an unlikely inconvenience.

What is claimed is:

1. A device for detecting the direction and speed of rotation of a rotating element including:
   first circuit means for generating a first pulsed signal having a frequency related to the rotation speed of said element;
   second circuit means receiving in input said first pulsed signal for producing a second sawtooth pulsed signal with frequency equal to the one of said first signal;
   third circuit means responsive to said second signal and to the rotation of said element for generating a third pulsed signal having frequency equal to the one of said first signal, said third pulsed signal having a phase angle relative to said first signal dependent on the direction of the rotation movement of said element, said third pulsed signal having a variable pulse width dependent both on the frequency and the phase angle;
   fourth circuit means responsive to said third pulsed signal to produce a fourth electrical signal, the fourth electrical signal having the form of sawtoothed pulses with its frequency equal to the frequency of said first signal, when the pulse width of said third signal is longer than a predetermined value, in form of a voltage rising ramp, for a width of said third signal lower than a predetermined value; and
   fifth circuit means responsive to said fourth signal to supply an informatin signal when the pulse width of said fourth signal exceeds a predetermined threshold value.

2. Device as claimed in claim 1 wherein said first circuital means comprises a first photosensitive element fed by a constant voltage and intermittently energized by the rotation of said element to produce said first pulsed signal and wherein said third circuit means comprises a second photosensitive element fed by said second signal produced by said second circuit means and intermittently energized by the rotation of said element to produce said third pulsed signal.

3. Device as claimed in claim 2 wherein said second circuit means comprises a resistor and a capacitor, series connected between a voltage supply and ground and a first transistor/switch for shorting said capacitor, said first transistor receiving at its base said first pulsed signal and wherein said third circuit means comprises a second resistor and a second capacitor, series connected between a voltage supply and the ground and a second transistor/switch for shorting said second capacitor, said second transistor receiving at its base said third pulsed signal.

* * * * *